(12) United States Patent
Martin et al.

(10) Patent No.: US 6,761,641 B2
(45) Date of Patent: Jul. 13, 2004

(54) GLASS LAMINATE SYSTEM FOR HOCKEY RINKS

(75) Inventors: Donald C. Martin, Martinsville, VA (US); Tonya M. Cockman, Greensboro, NC (US)

(73) Assignee: Clear Defense Sports and Athletic Laminates, LLC, Greensboro, NC (US)

( * ) Notice: Subject to any disclaimer, the term of this patent is extended or adjusted under 35 U.S.C. 154(b) by 0 days.

(21) Appl. No.: 09/919,480

(22) Filed: Jul. 31, 2001

(65) Prior Publication Data

US 2003/0032490 A1 Feb. 13, 2003

(51) Int. Cl.[7] ............................................... A63C 19/04
(52) U.S. Cl. ........................................ 472/92; 256/24
(58) Field of Search ............................. 472/92, 94, 88, 472/89; 256/1, 24, 25, 73

(56) References Cited

U.S. PATENT DOCUMENTS

| | | | | |
|---|---|---|---|---|
| 3,388,032 A | | 6/1968 | Saunders ..................... | 161/183 |
| 3,499,783 A | | 3/1970 | Nelson et al. ................ | 117/72 |
| 4,883,267 A | | 11/1989 | Burley ......................... | 472/90 |
| 4,905,970 A | * | 3/1990 | Holmsten et al. ............. | 256/24 |
| 4,952,459 A | * | 8/1990 | Thatcher ...................... | 428/212 |
| 4,983,461 A | | 1/1991 | Daude et al. ............ | 428/423.1 |
| 5,368,904 A | | 11/1994 | Stephinson ................. | 428/34 |
| 5,645,940 A | * | 7/1997 | Teddington et al. ........ | 156/103 |
| 5,897,438 A | | 4/1999 | Kunz et al. .................... | 472/90 |
| 5,902,198 A | | 5/1999 | Martin et al. ................ | 473/481 |
| 5,958,598 A | * | 9/1999 | Khudyakov et al. ........ | 427/379 |
| 6,095,503 A | * | 8/2000 | Burley et al. ................. | 256/24 |
| 6,106,401 A | * | 8/2000 | McAlpine ..................... | 472/92 |
| 6,224,976 B1 | | 5/2001 | Takushima et al. ..... | 428/355 R |

* cited by examiner

*Primary Examiner*—Kien T. Nguyen
(74) *Attorney, Agent, or Firm*—Meyers Bigel Sibley & Sajovec

(57) ABSTRACT

A transparent, shatter-resistant glass shield is provided for mounting atop the dasher board of a hockey rink. The glass shield includes at least one glass panel having a front surface, a back surface, and a plurality of edges. A glass-retaining plastic film is adhered to a surface of each glass panel such that the plastic film substantially covers the surface of each panel. Preferably, the plastic film is polyethylene terephthalate (P.E.T) or polycarbonate, has a thickness of about 0.014 inch, and includes three plastic layers. At least one edge retainer is engaged on an edge of each glass panel such that the edge retainer extends over substantially the full length of the engaged edge of the glass and overlaps the plastic film. The edge retainer portions preferably are U-shaped channels constructed of transparent polyvinyl chloride. Preferably, the glass panels are rectangular, and may include cutouts at their top corners to assist in mounting the glass shield atop the dasher board. To further support the glass, an additional plastic film may be applied to at least a portion of a second surface of the glass.

37 Claims, 5 Drawing Sheets

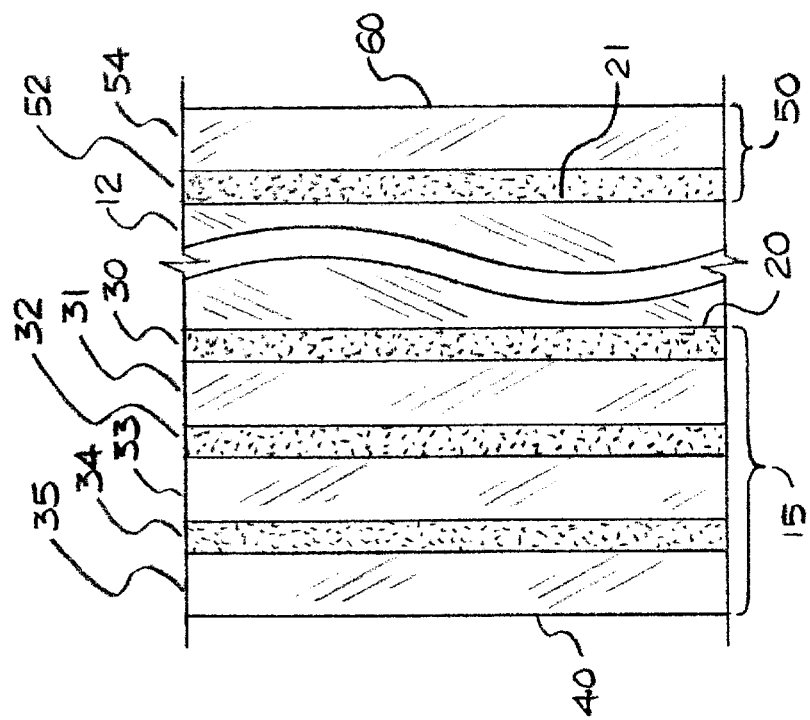
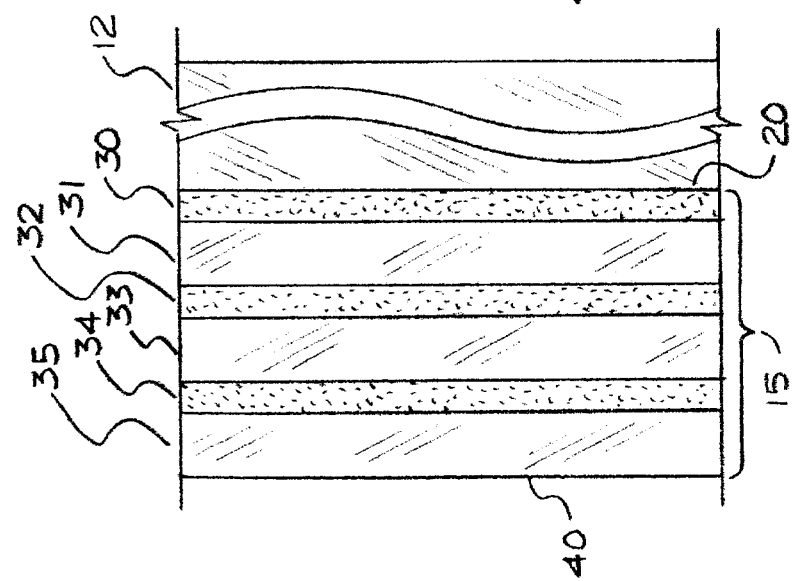
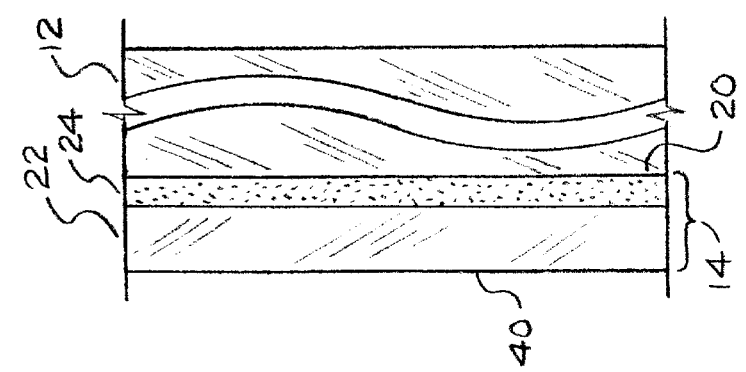

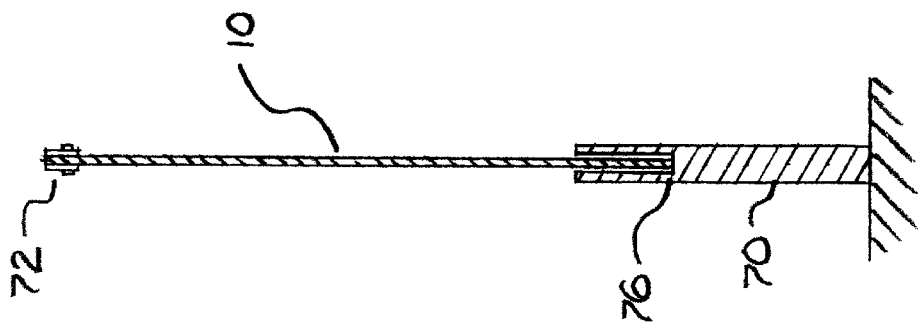
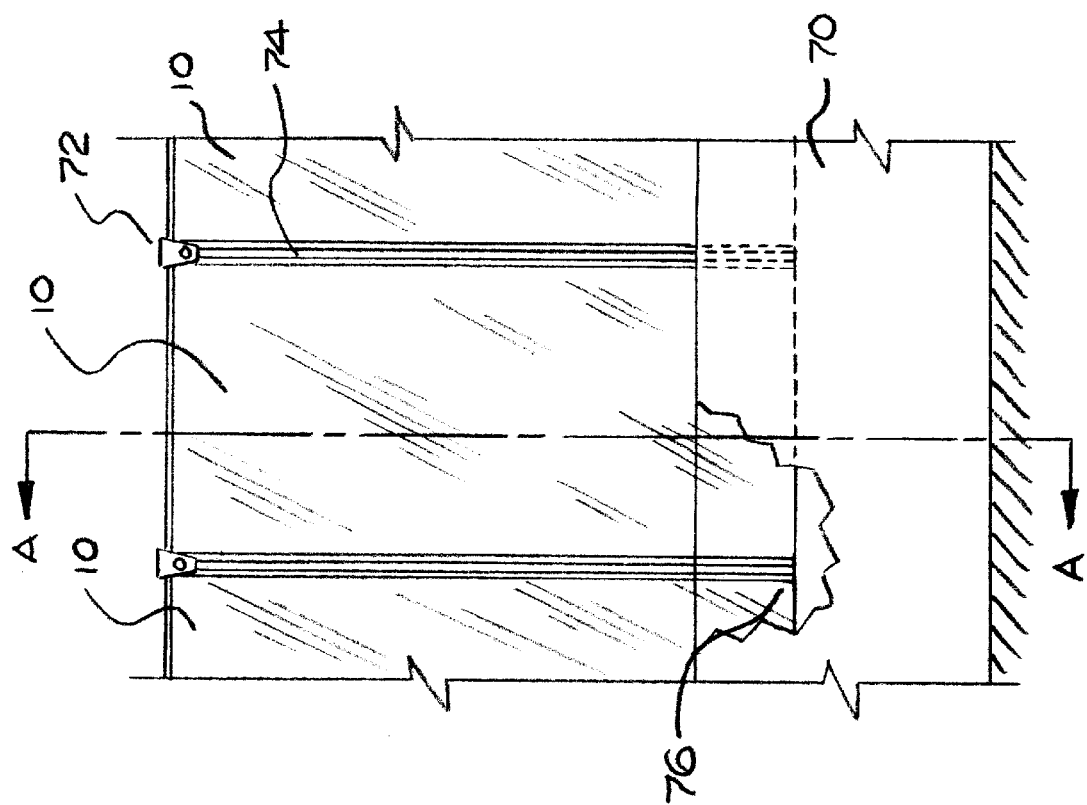

GLASS LAMINATE SYSTEM FOR HOCKEY RINKS

FIELD OF THE INVENTION

The present invention generally relates to protective glass barriers for hockey rinks, and more specifically to an improved shatter-resistant tempered glass panel with a transparent plastic film laminate adhered thereto and edge retainers engaged along the top and side edges of the glass panel.

BACKGROUND

Modern ice hockey rinks include glass barriers comprised of transparent glass panels encircling the rinks above the dasher boards. These glass panels protect spectators from flying pucks and debris, and assist the dasher boards to contain flying pucks while still permitting a relatively unobstructed view of the hockey action on the ice by spectators. The glass panels are typically constructed of thick, tempered glass. In more modern "seamless" glass barriers, the glass panels are supported side-by-side in a groove along the top of the dasher boards. Adjoining glass panels are clipped together at their top corners by metal brackets. Older glass barriers include mullions mounted to the dasher boards between the panels for supporting the panels. Seamless glass barriers are preferable because they permit a full, virtually unobstructed view of the ice and hockey game.

Unfortunately, when a player or a flying puck impacts these glass barriers with sufficient force, the glass can shatter into thousands of small fragments. Typically, these pieces are roughly oblong and, and approximately one-half (½) to one (1) inch long. Violent impacts with the glass can cause glass shards to rain down on players and officials on the ice and on nearby spectators in their seats. These glass projectiles create the possibility of skin lacerations and serious eye injury. Sports arena owners and operators cannot ignore the danger to the safety of participants and spectators at hockey games.

In addition to these safety issues, the shattering of the glass panels creates clean-up problems. Cleaning up shattered glass is an arduous task. Maintenance personnel must carefully locate and remove thousands of glass particles that have fallen to the ice and floor and slid under seats or other surrounding objects. It is difficult if not impossible to know whether each and every piece has been cleared from the ice or from spectator areas. If anyone slips and falls on an overlooked piece, serious injury can result. Also, even if some portions of the shattered glass do not fall to the ice or floor during breakage, they likely will during replacement operations.

Finally, the shattering of glass can have a major, outcome-determinative effect on the tempo of a hockey match. By the time broken glass is cleaned up and replaced, a team can easily lose its focus and momentum.

Others have attempted to address this problem in various ways. Tempered glass is typically used in ice hockey arenas instead of ordinary plate glass. Although tempered glass has superior strength over ordinary plate glass, breakage still occurs. In addition, to maximize the strength of the glass panels bordering the most critical portions of the hockey rink near the goals, five-eighths (⅝) inch thick panels are used. The less critical glass panels along the sides of the rink are typically only one-half (½) inch thick. The ⅝ inch glass panels flex very little when struck by players or pucks. Hockey players dislike the thicker ⅝ inch panels because their rigidity causes colliding hockey players more pain than the more flexible ½ inch panels. Also, the more rigid ⅝ inch panels can cause more concussions to colliding players than the more forgiving ½ inch glass panels. In addition, the ⅝ inch panels are approximately seventy five (75) pounds heavier than the ½ inch panels. Because many hockey arenas are also multi-use facilities, the heavier ⅝ inch panels make the oft-repeated breakdown and reassembly of the glass barriers more difficult for workers. Therefore, it is desirable to have shatter-resistant glass barriers for hockey rinks that are constructed entirely of the lighter and more flexible ½ inch glass panels.

Also, U.S. Pat. No. 5,897,438 to Kunzet al. discloses a modular rink assembly that may include plexi-glass panels mounted atop the sideboards and end boards. Though plexi-glass panels are more shatter-resistant than tempered glass panels, plexi-glass is much more easily scratched than tempered glass. Over time, accumulated scratches on plexi-glass panels affect the transparency of the panels, and impair the view of the hockey action for spectators and television cameras. Therefore, it is desirable to have a shatter-resistant transparent barrier for hockey rinks which is also scratch and scar resistant.

None of the above solutions seek to restrain glass particles from dismantling from a glass barrier once the inevitable breakage occurs. Also, apparently no prior art solutions have targeted broken glass retention systems in a retro-fit manner to decrease the hazardous potential of broken glass.

Thus, there is a need in the art for an improved glass panel for hockey rinks that minimizes the ill effects of shattered glass. Also, there is a need in the art to provide a shatter resistant glass barrier constructed entirely of the more flexible ½ inch glass panels. Furthermore, there is a need for a retro-fit system for improving the shatter resistance of glass panels surrounding hockey rinks.

SUMMARY OF THE INVENTION

A transparent, shatter-resistant glass shield is provided for mounting atop the dasher board of a hockey rink. The glass shield includes at least one glass panel having a front surface, a back surface, and a plurality of edges. A glass-retaining plastic film is adhered to a surface of each glass panel such that the plastic film substantially covers the surface of each panel. Preferably, the plastic film is polyethylene terephthalate (P.E.T) or polycarbonate, has a thickness of about 0.014 inch, and includes three plastic layers. At least one edge retainer is engaged on an edge of each glass panel such that the edge retainer extends over substantially the full length of the engaged edge of the glass and overlaps the plastic film. The edge retainer portions preferably are channels constructed of transparent polyvinyl chloride. The glass panel is preferably rectangular, and may include radiused corners at its top to assist in mounting the glass shield atop the dasher board. To further support the glass, an additional plastic film may be applied to at least a portion of a second surface of the glass.

These and other aspects of the present invention as disclosed herein will become apparent to those skilled in the art after a reading of the following description of the preferred embodiments when considered with the drawings.

BRIEF DESCRIPTION OF THE DRAWINGS

FIG. 4 is a cross section of the glass panel of FIG. 2;

FIG. 5 is a cross section showing a preferred embodiment of the glass panel of FIG. 2;

FIG. 6 is a cross section showing an alternative embodiment of the glass panel of FIG. 2;

FIG. 7 is a front view of the glass panel of FIG. 2 mounted on the dasher board of a hockey rink; and FIG. 8 is a cross section of the assembly of FIG. 7 taken along line A—A.

DESCRIPTION OF THE PREFERRED EMBODIMENTS

Figure 1:
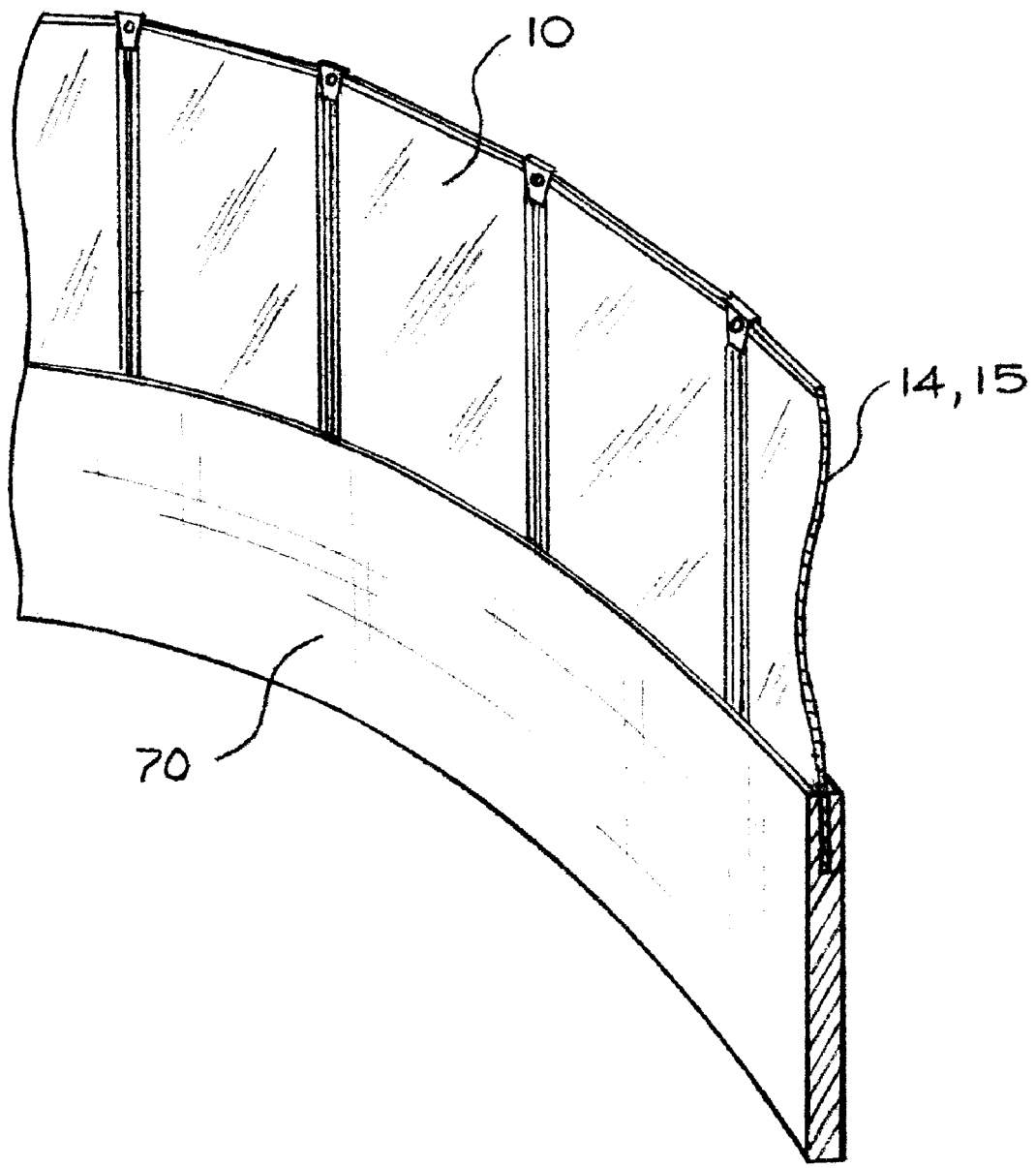
FIG. 1 is an environmental view of a corner portion of a hockey rink dasher board including glass panels according to the present invention.

FIG. 1 illustrates a corner portion of a hockey rink dasher board including a system of shatter-resistant glass panels according to the present invention. The dasher board 70 shown in FIG. 1 is typical of dasher boards used in modern ice hockey rinks. The complete dasher board bounds an entire oval rink, and is typically comprised of a series of panels that extend about 3.5 to 4 feet above the surface of the ice. The dasher board forms a boundary around the ice to contain players, pucks, and debris within the field of play. The glass panels 10 are mounted atop the dasher board 70 to form a continuous transparent barrier to further contain players, pucks, and debris within the field of play. The transparent panels 10 shield spectators from flying pucks and debris while permitting a virtually unobstructed view of the ice and hockey game by spectators. The transparent panels 10 are typically tallest around the ends of the rink behind the goals and are often shorter along the less-critical sides of the rink.

Figure 2:
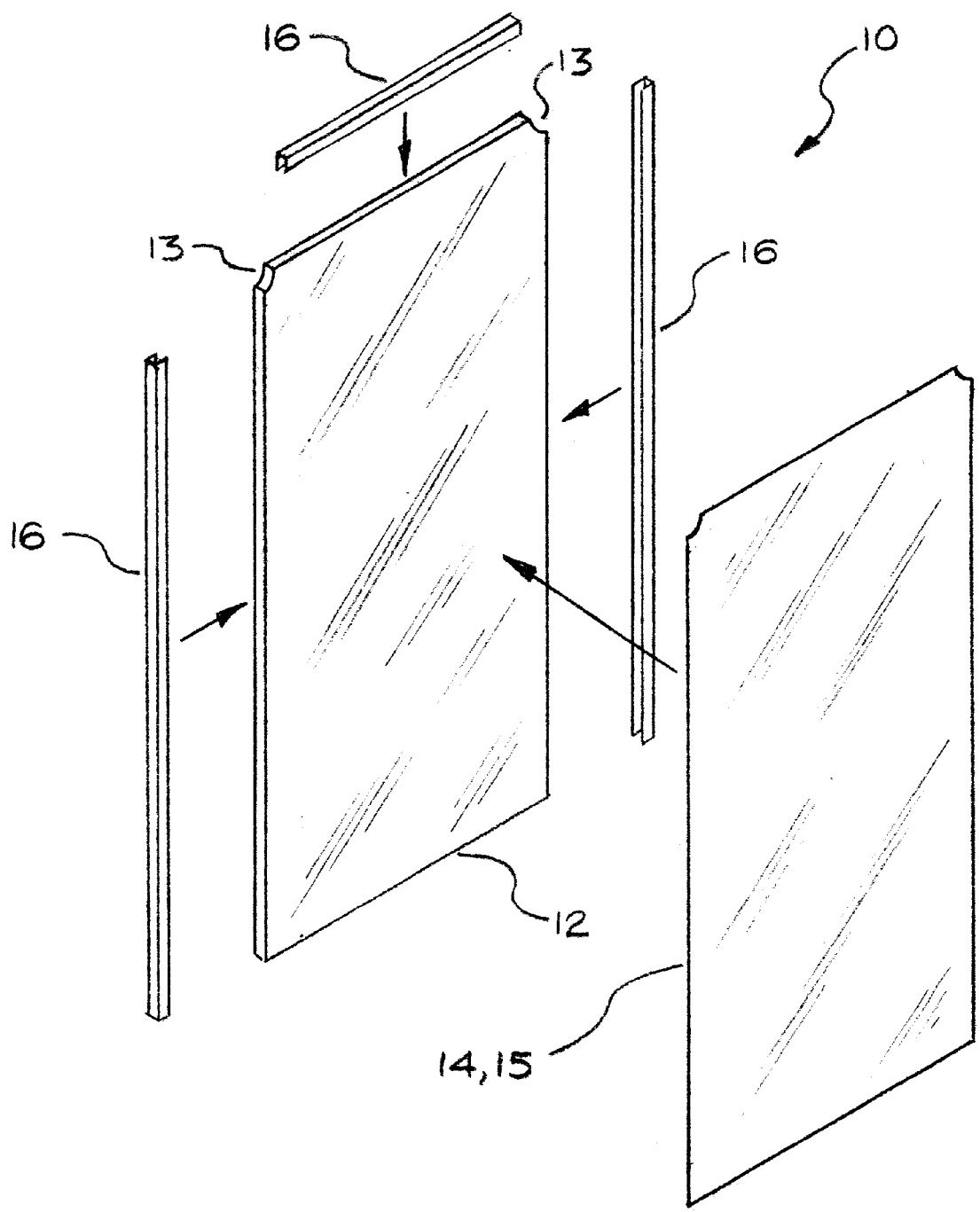
FIG. 2 is an exploded view of a glass panel assembly for a hockey rink according to the present invention.

FIG. 2 is an exploded view of a shatter-resistant, tempered glass panel assembly 10 illustrating an embodiment of this invention. A glass panel 12 is constructed of tempered glass, and is preferably about ½ inch thick. The shatter-resistant glass panel assembly 10 has an overall thickness of about ½ inch, and is suitable for installation both along the sides and ends of a hockey rink, permitting lighter, more flexible panels to replace the thicker, more rigid ⅝ inch panels typically used along the ends of hockey rinks near the goals. The glass panel assembly 10, however, may have a thickness greater than ½ inch if desired. A typical glass side panel 12 for a hockey rink is about seventy five (75) inches tall by about forty eight (48) inches wide. For a "seamless" glass barrier, the glass panel 12 typically includes a cutout at each top corner 13 as shown in FIG. 2 to assist in connecting adjoining panels. In a preferred embodiment, the cutouts have a radius of about ½-inch. The illustrations of the glass panels 12 shown in FIGS. 2–8 are intended to represent conventional tempered glass panels like those commonly used in hockey rinks today.

A plastic film 14, 15 is also shown in FIG. 2. The plastic film may be a single-ply film 14, but preferably is a multi-ply film 15 having a plurality of plastic layers. In a preferred embodiment, the multi-ply film 15 includes three plastic layers. The film 14,15 is cut and shaped to cover substantially one surface of the glass panel 12 from edge to edge. Placing the film 14,15 on the back surface (spectator side) is preferred to avoid marring of the plastic film by pucks, hockey sticks, or the like. Also, placing the film 14, 15 on the back of the glass panel 12 acts to contain any loose shattered glass particles on the ice side of the glass panel 12. Nevertheless, the film 14, 15 could also be applied to the front surface (ice side) of the glass panel 12 in an alternative embodiment. The plastic film 14, 15 is adhered to the glass panel as discussed in detail below.

Figure 3:
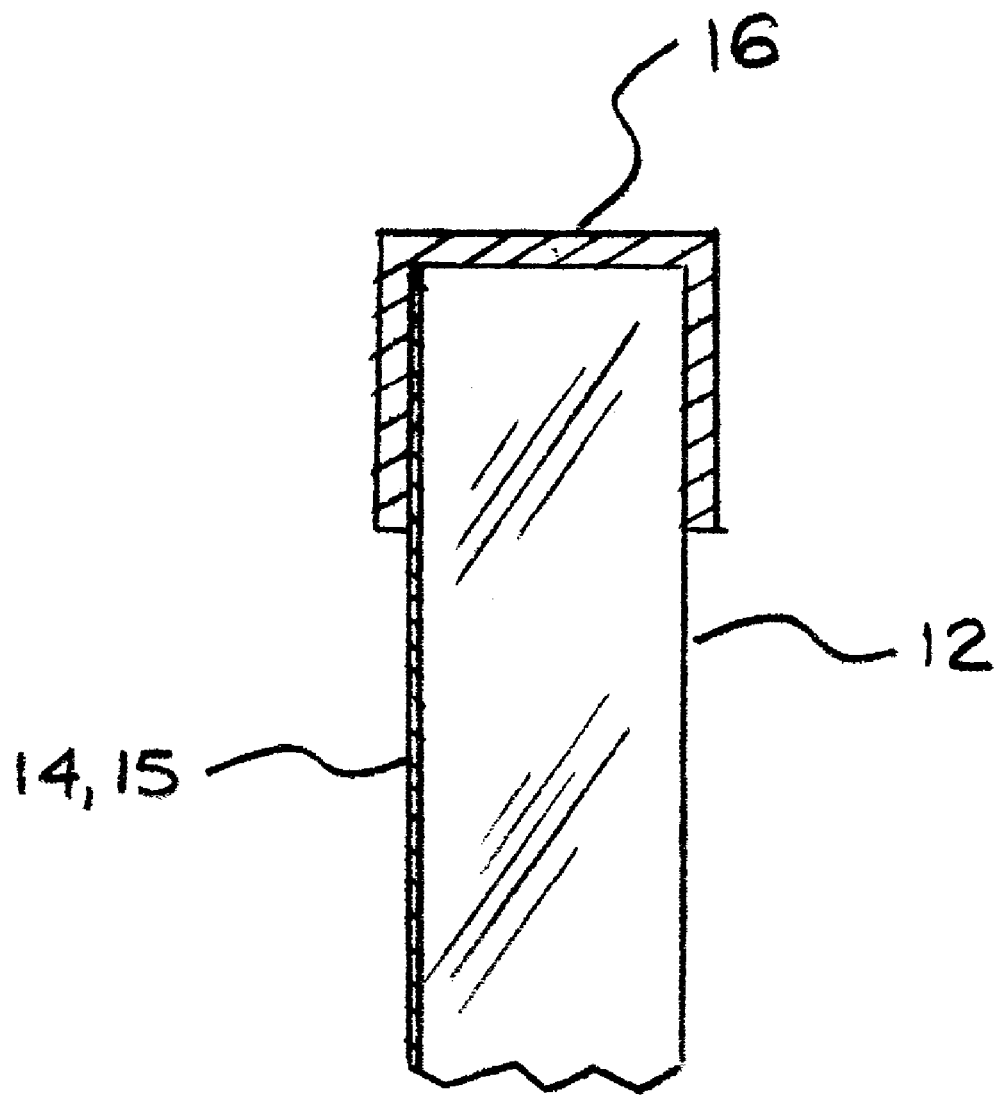
FIG. 3 is a partial section view of an edge of the glass panel assembly of FIG. 2.

As also seen in FIG. 2, edge retainers 16 are assembled and adhered along the top and side edges of the glass panel 12 after the plastic film 14, 15 is adhered to the back surface. As best seen in FIG. 3, the edge retainers 16 preferably are U-shaped channels that engage the aligned edges of the glass panel 12 and adhered plastic film 14, 15. The channels can be adhered in place to the edges of the glass panel and plastic film by a two-part epoxy adhesive. In addition, the channels may be constructed of resilient material such as polyvinyl chloride (PVC) and may be sized to resiliently engage the edges of the glass panel and plastic film. The edge retainers 16 aid in retaining the glass and adhered plastic film 14, 15 together at their edges when the glass panel 12 is shattered. When the tempered glass panels 12 are impacted by a concentrated blow such as the impact of a hockey puck, the energy imparted to the glass at the point of impact radiates through the glass panels to their edges. Without the edge retainers 16, this radiating energy may cause the free edges of the glass panels to rapidly shatter and seemingly "explode" outwardly from the side and top edges. The edge retainers 16 reinforce the edges of the glass and work in combination with the film adhesive to keep the glass connected to the film 14, 15, thereby preventing shattered glass from exploding out the top and side edges upon impact. Preferably, the edge retainers 16 are constructed of transparent polyvinyl chloride (PVC). The edge retainers 16 are sized and shaped to firmly engage the edges of the glass panel 12 and adhered plastic film 14, 15. This retention system also stabilizes the shattered glass panel for removal and replacement such that standard suction cup systems for handling glass can be used.

FIGS. 4–6 are cross sections of various embodiments of the glass panel 12 and adhered plastic film 14, 15. FIG. 4 illustrates a single-ply plastic film 14 mounted on a tempered glass panel 12. The back surface 20 of the glass panel 12 faces the spectators when the glass panel assembly 10 is mounted in a hockey rink. The plastic film 14 in this embodiment is comprised of a film-to-glass adhesive layer 24 and a single-ply plastic layer 22 having a desired thickness.

FIG. 5 illustrates a preferred three-ply plastic film 15 having an overall thickness of about 0.014 inch. This preferred embodiment includes a film-to-glass adhesive layer 30, a first plastic layer 31, a first interstitial adhesive layer 32, a second plastic layer 33, a second interstitial adhesive layer 34, and a third plastic layer 35. The plastic layers 31, 33, and 35 typically are comprised of a polymerized ethylene resin such as polyethylene terephthalate (P.E.T.). Alternatively, polycarbonate films may be used. In the preferred embodiment, the outermost plastic layer 35 has a scratch resistant coating 40 applied to its outer surface. This coating protects the film during cleaning and maintenance.

FIG. 6 illustrates another alternative embodiment which is the same as the embodiment of FIG. 5 except an additional plastic film 50 is applied to the front surface 21 (ice side) of the glass panel 12. A plastic layer 54 is adhered to the front surface 21 by an adhesive layer 52. This additional plastic layer 50 further strengthens the glass panel, assists the first plastic layer 15 to retain shards of broken glass, and particularly aids in preventing glass particles from falling onto the ice. A scratch resistant coating 60 may be applied to the exposed surface of the plastic layer 54.

The film-to-glass bonding adhesive 24, 30, or 52, in a preferred embodiment, is already applied to the plastic layer 22, 31, or 54 when the plastic film is obtained from a film supplier. The adhesive 24, 30, or 52 is exposed by removing a release liner (not shown) prior to application to the glass 12. The adhesive must have sufficient bonding strength so that the majority of the glass particles will remain bonded to the film 14, 15 after breakage. Also, the adhesive must be substantially optically clear to not distort the existing clarity of the glass 12. In a preferred embodiment, the adhesive is selected from the following group: acrylic copolymer pressure sensitive adhesive; an acrylic-vinyl acetate pressure sensitive adhesive; or a vinyl ether polymer pressure sensitive acetate adhesive. Adhesive density typically is approximately fourteen (14) pounds per ream. After application, the adhesive layer typically consumes no more than 1 mil of thickness. The film-to-film laminating adhesive 32 and 34 shown in FIGS. 5 and 6 also must be substantially optically clear, and can be formed from the following: acrylic copolymer pressure sensitive adhesive; an acrylic-vinyl acetate pressure sensitive adhesive; or a vinyl ether polymer pressure sensitive acetate adhesive. Laminating adhesive density typically is seven (7) pounds per ream. Suitable suppliers of pressure sensitive adhesives and scratch resistant coatings include National Starch & Chemical Corp., Ashland Chemical Co., and Morton International, Inc.

Plastic film 30, 50 of the type used herein can be obtained from many suppliers of safety and security film, such as Clear Defense Incorporated, 121 E. Main St., Martinsville, Va. Preferred properties for the plastic film and the PVC channels and epoxy adhesive are as follows:

TABLE

| FILM PROPERTIES | |
| --- | --- |
| Color | Clear |
| Number of Film Layers | 3 |
| Laminate Thickness (including adhesive) inches (microns) | 0.014 (335) |
| Tensile Strength - PSI | 28,000 |
| Break Strength - lbs/inch | 350 |
| Peel Strength - lbs/inch | 7 |
| PVC CHANNEL AND EPOXY PROPERTIES | |
| Color | Clear |
| Elongation | 75% |
| Tensile Strength | 1850 psi |
| Hardness (ASTM D 2240) Shore D | 83 |
| Peel strength (Bonds cured 24 hrs. @ Room temp + 2 hrs. @ 160 F.) Bonds tested at: | |
| −67 F. | 2 piw |
| +70 F. | 13 piw |
| +120 F. | 15 piw |
| Overlap Shear Strength vs. Temp. Bonds tested at: | |
| −67 F. | 3000 psi |
| +70 F. | 3500 psi |
| +120 F. | 750 psi |
| Worklife | 3–4 minutes |

The above film, PVC channel, and epoxy materials were selected because they have been found to provide an excellent combination of strength, durability, and transparency. Other materials that have similar properties may also be used. The tensile and break strength values above were measured in accordance with the following standards: ASTM D 882-75 (American Society for Testing Materials); ASTM 1004-76; ASTM D 1938-67. The lbs/inch values above are per linear inch of width.

FIGS. 7 and 8 illustrate a plurality of glass panels 10 according to the present invention mounted on a dasher board 70 of a hockey rink to form a "seamless" transparent protective barrier. The glass panels 10 are arranged side by side in a groove 76 along the top edge of the dasher board 76 such that the plastic film 14, 15 faces the spectators. A plastic film 50 as shown in FIG. 6 can be included on the front face (ice side) of the glass for added protection. The panels have a gap 74 between their adjacent edges 72 which is about three-tenths (3/10) of an inch wide. Triangular metal brackets 72 align and retain the glass panels 10 together at their upper corners. These brackets engage cutouts at the top corners 13 of the glass panels 10 shown in FIG. 2. The present invention is also suitable for use in older "non-seamless" glass barriers which include mullions mounted on the top edges of the dasher boards between each glass panel to support the glass panels.

A manual method of applying plastic film 14, 15, or 50 to a tempered glass basketball backboard is disclosed in detail in U.S. Pat. No. 5,902,198, to Martin et al, at column 5, line 25, through column 7, line 62. The disclosure of that patent is hereby incorporated by reference. The same process may be used for applying the plastic film to glass panels for hockey rinks, and can be used for either existing hockey rink glass panels or for an OEM installation.

The invention can be applied in a retro-fit situation on any type of dasher or glass system. The glass panels are first removed from the groove of the dasher board and placed on a rolling A-frame glass handling device for cleaning and preparing the glass to receive the plastic film. The preferred three-ply, 14 mil plastic laminate is cut to fit the entire spectator side surface of each glass panel and is manually adhered to the glass using the same technique described in the above-referenced patent. After the plastic film is applied to the glass, the clear PVC channel molding is cut to the lengths of the two vertical side and top edge of each glass panel. The bottom edges of the glass panels do not receive the PVC channel molding because they are engaged in a groove in the top of the dasher board which provides adequate glass/film reinforcement at the bottom edge of the glass panels. The PVC channels are slid onto the top and side edges such that the channels clip over the edges of the glass and plastic laminate. The channels are adhered in place by a two-part epoxy adhesive. The channel molding prevents chipping of the edges and corners of the glass panels during handling. Also, if a glass panel is broken during play or handling, the channel molding prevents the shattered glass from exploding out the top or sides of the glass panel.

The manual process described above can also be used for an OEM installation. In a preferred OEM installation, however, the process of applying the plastic film laminate to the glass is done by machine without the use of slip solutions and manual application tools. This machine application utilizes proper glass washing equipment, cold lamination, and film-to-glass lamination equipment with precise web tension and nip roller pressure controls in a clean room environment. The machine lamination process provides a very clear panel with a well-anchored plastic film.

After the plastic film is adhered to a glass panel by one of the above methods, the PVC retainer channels are installed on the top and side edges of the panel as described above. A sticker may be applied to the unlaminated side of the glass panel to aid in properly orienting the laminated panel during installation in a hockey rink such that the laminated side faces the spectators and the unlaminated side faces the ice. The plastic film must face the spectators to provide maximum protection against shattered glass caused by an impact to the ice side of the glass.

The above description of the preferred embodiments thus details many ways in which the present invention can provide its intended purposes. While several preferred embodiments are described in detail hereinabove, it is appar-

We claim:

1. A protective barrier for a hockey rink, the protective barrier comprising:
   (a) a dasher board having a top rim;
   (b) at least one glass panel mounted on the top rim of the dasher board, wherein each glass panel has a front surface, a back surface, and a plurality of edges;
   (c) a glass-retaining plastic film adhered to a surface of each glass panel, wherein the plastic film substantially covers the surface; and
   (d) at least one edge retainer engaged on an edge of each glass panel, wherein each edge retainer extends over substantially the full length of the edge and overlaps the plastic film along the edge, wherein the plastic film and edge retainers on a panel assist in the retention of a substantial portion of broken glass after breakage of that glass panel;
   (e) wherein each of the glass panels has a thickness of about one-half inch.

2. The protective barrier of claim 1 wherein the plastic film is comprised of at least one plastic layer and an adhesive layer.

3. The protective barrier of claim 2 wherein the plastic film further comprises a release liner adjacent to the adhesive layer.

4. The protective barrier of claim 2 wherein the plastic film further comprises a scratch resistant coating adjacent to the plastic layer.

5. The protective barrier of claim 2 wherein the adhesive layer is an acrylic copolymer pressure sensitive adhesive.

6. The protective barrier of claim 2 wherein the adhesive layer is an acrylic-vinyl acetate pressure sensitive adhesive.

7. The protective barrier of claim 2 wherein the adhesive layer is a vinyl-ether polymer pressure sensitive acetate adhesive.

8. The protective barrier of claim 2 wherein the plastic film has a thickness of about 0.014 inch.

9. The protective barrier of claim 8 wherein the plastic film is comprised of a plurality of plastic layers.

10. The protective barrier of claim 1 wherein the plastic film has a scratch-resistant coating applied thereto.

11. The protective barrier of claim 1 wherein the plastic film is polyethylene terephthalate.

12. The protective barrier of claim 1 wherein the plastic film is polycarbonate film.

13. The protective barrier of claim 1 wherein the glass panels are rectangular and the plurality of edges of each glass panel includes a top edge and first and second side edges.

14. The protective barrier of claim 13 wherein a first edge retainer is engaged on the top edge, a second edge retainer is engaged on the first side edge, and a third edge retainer is engaged on the second side edge of the glass panels.

15. The protective barrier of claim 13 wherein each glass panel further includes a first ½-inch radiused corner between the top edge and the first side edge, and a second ½-inch radiused corner between the top edge and the second side edge, wherein the first and second beveled corners assist in mounting the glass shield around a hockey rink.

16. The protective barrier of claim 1 wherein each glass panel is tempered glass.

17. The protective barrier of claim 1 wherein the plastic film is adhered to the back surface of each glass panel.

18. The protective barrier of claim 17 wherein at least one additional plastic film is applied to at least a portion of the front surface of each glass panel.

19. The protective barrier of claim 1 wherein the edge retainers are channels having a U-shaped cross-section.

20. The protective barrier of claim 19 wherein the edge retainers are constructed of polyvinyl chloride that is substantially transparent.

21. The protective barrier of claim 1 wherein the edge retainers are adhered to the glass panel and plastic film along the engaged edges of the glass panels.

22. The protective barrier of claim 1 wherein the at least one edge retainer is formed of polyvinyl chloride (PVC).

23. The protective barrier of claim 1 wherein the at least one edge retainer is transparent.

24. The protective barrier of claim 1 wherein the at least one edge retainer includes a channel having a U-shaped cross-section and engages each of the front and back surfaces of the glass panel.

25. The protective barrier of claim 1 wherein at least one of the plurality of edges is a free, top edge, the least one edge retainer is engaged on the free, top edge of each glass panel, and each edge retainer extends over substantially the full length of the free, top edge and overlaps the plastic film along the free, top edge.

26. The protective barrier of claim 25 wherein:
   each glass panel has opposed side edges and a bottom edge;
   the at least one edge retainer engages and extends over substantially the full length of each of the side edges; and
   the bottom edge is disposed within the top rim of the dasher board.

27. A protective barrier for a hockey rink, the protective barrier comprising:
   (a) a dasher board section having a top rim, a support groove in the top rim, and a plurality of glass support members spaced incrementally along the top rim;
   (b) a plurality of transparent, shatter-resistant tempered glass panel assemblies engaged in the support groove and supported by and between the incrementally spaced glass support members, wherein each glass panel assembly includes:
      (i) a rectangular glass plate having a back surface, a top edge, a bottom edge, and first and second side edges;
      (ii) a glass-retaining plastic film having one or more plastic layers adhered to the back surface of the glass plate, wherein the plastic film extends substantially from the top edge to the bottom edge and from the first side edge to the second side edge of each panel;
      (iii) a plurality of transparent edge retainers engaged on the top and side edges of the glass plate, wherein the edge retainers extend over substantially the full lengths of the top and side edges, and the edge retainers overlap substantially the full lengths of the edges of the plastic film along the top and side edges; wherein the plastic film and edge retainers assist in the retention of a substantial portion of a glass plate after breakage of the glass plate.

28. The protective barrier for a hockey rink according to claim 27 wherein each glass plate is about one-half inch thick, including those glass plates mounted at each end of the hockey rink behind and near the hockey rink goals.

29. The protective barrier for a hockey rink according to claim 27 wherein each glass plate is about one-half inch thick.

30. A protective barrier for a hockey rink comprising:

(a) a dasher board having a top rim;

(b) a tempered glass panel mounted on the top rim of the dasher board and having a front surface, a back surface, and peripheral edges;

(c) transparent plastic film having one or more plastic layers adhered to the rear surface, the front surface, or both the rear and front surfaces of the glass panel;

(d) adhesive adhering the plastic film to the glass panel; and (e) a plurality of transparent retention channel portions engaged on at least some of the peripheral edges of the glass panel and overlapping the plastic film along these edges, wherein the adhesive has sufficient properties so that a substantial portion of the tempered glass will remain adhered to the plastic film upon breakage, and wherein the retention channel portions together with the plastic film retain the broken glass along the peripheral edges such that the glass panel remains substantially in one piece upon breakage;

(f) wherein the glass panel has a thickness of about one-half inch.

31. A protective barrier for a hockey rink, the protective barrier comprising:

(a) a dasher board having a top rim;

(b) at least one glass panel mounted on the top rim of the dasher board; and (c) a glass-retaining plastic film adhered to a surface of each glass panel, wherein the plastic film substantially covers the surface;

(d) wherein the plastic film has a thickness of about 0.014 inch; and (e) wherein each glass panel is about one-half inch thick.

32. The protective barrier of claim 31 wherein the plastic film is comprised of at least one plastic layer and an adhesive layer.

33. The protective barrier of claim 31, wherein the plastic film is polyethylene terephthalate.

34. The protective barrier of claim 31, wherein the plastic film is polycarbonate film.

35. The protective barrier of claim 31, wherein the plastic film is comprised of a plurality of plastic layers.

36. The protective barrier of claim 31 wherein the glass panel is tempered glass.

37. A protective barrier for a hockey rink, said protective barrier comprising:

(a) a dasher board having a top rim;

(b) at least one transparent, shatter-resistant glass shield mounted on the top rim of the dasher board, the glass shield including:

at least one glass panel; and a glass-retaining plastic film adhered to a surface of each glass panel, wherein the plastic film substantially covers the surface;

wherein the plastic film has a thickness of about 0.014 inch; and wherein each glass panel is about one-half inch thick.

* * * * *